US006977592B2

(12) United States Patent
Orlewski

(10) Patent No.: US 6,977,592 B2
(45) Date of Patent: Dec. 20, 2005

(54) DEVICE FOR DETECTING PASSENGERS OF A VEHICLE

(75) Inventor: Pierre Orlewski, Keispelt (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 10/477,058

(22) PCT Filed: May 7, 2002

(86) PCT No.: PCT/EP02/05015

§ 371 (c)(1),
(2), (4) Date: Nov. 7, 2003

(87) PCT Pub. No.: WO02/090901

PCT Pub. Date: Nov. 14, 2002

(65) Prior Publication Data

US 2004/0183688 A1    Sep. 23, 2004

(30) Foreign Application Priority Data

May 8, 2001 (LU) .......................................... 90771

(51) Int. Cl.$^7$ ............................................. G08B 21/00
(52) U.S. Cl. ..................................... 340/667; 200/85 A

(58) Field of Search ............................... 340/666, 667, 340/584, 602; 200/85 A; 701/45; 280/735

(56) References Cited

U.S. PATENT DOCUMENTS

| 5,612,876 | A  | * | 3/1997  | Zeidler et al. ................. 701/45 |
| 6,015,163 | A  | * | 1/2000  | Langford et al. ............ 340/667 |
| 6,068,332 | A  |   | 5/2000  | Faust et al. |
| 6,109,117 | A  | * | 8/2000  | Stanley et al. ......... 73/862.325 |
| 6,395,121 | B1 | * | 5/2002  | De Bastiani ................ 156/250 |
| 6,653,577 | B2 | * | 11/2003 | Breed et al. ................. 280/735 |
| 2003/0141983 | A1 | * | 7/2003 | Schmiz et al. .............. 340/687 |

FOREIGN PATENT DOCUMENTS

| DE | 4237072  | 12/1993 |
| FR | 2790430  | 9/2000  |
| WO | 99/58023 | 11/1999 |
| WO | 00/26626 | 5/2000  |

* cited by examiner

Primary Examiner—Thomas Mullen
(74) Attorney, Agent, or Firm—McCormick, Paulding & Huber LLP

(57) ABSTRACT

A detection device for an automobile seat includes a flexible pressure sensor having an upper face and a lower face, as well as a decoupling layer fixed on the lower face of the pressure sensor. The decoupling layer has a constant modulus of elasticity.

19 Claims, 1 Drawing Sheet

DEVICE FOR DETECTING PASSENGERS OF A VEHICLE

CROSS-REFERENCE TO RELATED APPLICATIONS

This application is entitled to the benefit of and incorporates by reference in their entireties essential subject matter disclosed in International Application No. PCT/EP02/05015 filed on May 7, 2002 and Luxembourg Patent Application No. 90 771 filed on May 8, 2001.

FIELD OF THE INVENTION

The present invention relates to a detection device intended to be integrated into an automobile seat, such as for example a device for detecting seat occupancy or device for classifying a passenger seated on the seat. These devices generally comprise a flexible pressure sensor, which detects a pressure exerted by a passenger on the seat.

BACKGROUND OF THE INVENTION

A flexible pressure sensor is for example described in document DE-A-42 37 072. This deals with a pressure detector to be integrated into the passenger's seat, which comprises two insulating flexible substrates disposed a certain distance one above the other with the aid of a spacer. The spacer comprises e.g. a double-sided adhesive tape which is cut out in such a way as to at least partly surround the active zones of the detector. Inside the active zones, one of the support sheets is furnished with two mutually separated electrode structures made of conducting material, while the other support sheet is furnished with a pressure sensitive coating of semiconducting or resistive material. The semiconducting or resistive material exhibits microbumps on the surface, so that the surface resistance between the layer and a conductor decreases when the layer is pressed down onto the conductor.

Another execution of a flexible seat sensor is described in document WO-A-00/26626. This deals with a sensor comprising a flexible support made of insulating material, at least two electrode structures disposed on said insulating substrate a certain distance from one another, and a layer of semiconducting material disposed above said electrode structures. Said layer of semiconducting material exhibits an internal resistance that varies with deformation of said layer and is disposed in intimate contact with the electrode structures.

In order to detect the presence of a passenger on a seat, the flexible sensor is integrated into the automobile seat, for example on the seating surface of the seat between the foam and the cover of the seat. The measured pressure and/or the distribution of the pressure over the seat make it possible to decide whether the seat is occupied and/or the stature of the seated person.

It is clear that detection devices of this kind need a defined reaction of the seat part situated under the flexible sensor in order to operate properly. This reaction of the seat ought to be constant over the lifetime of the vehicle and under any atmospheric conditions. However, the foam of the seat, for example a polyurethane foam, exhibits a hardness which is greatly dependent on the ambient temperature. Moreover, the stability of the foam will decrease with the age of the vehicle. It follows that the signal detected by such a detection device for one and the same occupancy of the seat will vary considerably in the course of time.

OBJECTS AND SUMMARY OF THE INVENTION

The object of the present invention is to propose an improved detection device for an automobile seat.

In accordance with the invention, this objective is achieved by a detection device for automobile seat, comprising a flexible pressure sensor and a decoupling layer fixed on the lower face of the pressure sensor, said decoupling layer comprising a constant modulus of elasticity. The decoupling layer forms a support for the pressure sensor, which exhibits a constant modulus of elasticity. The pressure sensor is consequently decoupled from the foam of the seat, which foam exhibits a modulus of elasticity that is quite variable with temperature and over the lifetime of the seat. It follows that with the detection device of the present invention, the reaction of the support of the pressure sensor is largely independent of the temperature conditions and of the age of the device. Consequently, the device is characterized by a constant mechanical behaviour within a wide range of temperatures. Moreover, the mechanical strength of the decoupling layer is stable over the lifetime of the device, allowing reliable detection over the entire lifetime of the seat.

In a preferred embodiment, the decoupling layer comprises an open structure with a lower layer and a spacing structure disposed on said lower layer. An open structure such as this is favourable to circulation of air in the decoupling layer and consequently allows very effective ventilation of the detection device and of the seat. Moreover, the decoupling layer is preferably composed of hydrophobic or at least non-hydrophilic materials, so that the drying of the seat by circulation of air is facilitated. It follows that the comfort of the seat can be considerably improved as compared with a seat comprising a conventional detection device.

Said spacing structure can comprise flexible spacer elements distributed over a surface of the lower layer. These spacer elements comprise for example neoprene blocks and/or rubber rings and/or metal springs and/or pockets filled with a gas. These elements provide for stability of the mechanical properties of the decoupling layer over a long lifetime. It should be noted that the number of spacer elements determines the mechanical strength of the decoupling layer, that is to say its modulus of elasticity. It is therefore possible to tailor the strength properties of the seat/sensor assembly to a large extent, that is to say to influence the comfort of the seat. It will be appreciated that this modulation of the comfort of the seat may also be achieved through a combination of different layers having different hardnesses.

In another execution, said spacing structure comprises a bracing fabric, that is to say a 3D woven open structure. Structures such as these made of bracing fabric are for example known from Patent Application EP-A-0 616 065.

In order to provide a plane surface for the fixing of the flexible sensor onto the decoupling layer, the latter preferably comprises a nonwoven upper layer. The nonwoven layer can for example be sewn into the spacing structure. The pressure sensor can advantageously be mounted on the decoupling layer by bonding the pressure sensor onto the nonwoven upper layer or by fixing it with a self-fastening system of the Velcro or magnetic type. It should be noted that a self-fastening system of the Velcro type may possibly comprise a single tape furnished with hooks, which is bonded onto the pressure sensor. The hooks of the tape fasten in this case directly into the fibres of the nonwoven layer, that is to say the nonwoven layer will form the "female" part of the gripping system.

The lower layer may also comprise a nonwoven layer, which will advantageously facilitate the mounting of the detection device on the foam of the seat e.g. by bonding or by a self-fastening system.

In an advantageous execution of the detection device, a heating element is integrated into the decoupling layer. In such an execution, the detection device and the seat heating form a prefabricated module with preferably a single connector that can easily be installed on the seat. The integration of the heating element into the decoupling layer moreover makes it possible to minimize the interference between the heating element and the pressure sensor. It should be noted that the open structure of the decoupling layer encourages the convection of the heat emanating from the heating element, thereby ensuring good dispersal of hot air in the seat and increasing the comfort of a seat equipped with such a device. It will be appreciated that the heating element will advantageously be integrated into the nonwoven lower layer. Such an execution protects the passenger from any sense of burning and protects the seat trim (in particular the leatherwork) from premature aging due to excess warming or to drying out.

Another variant of the device comprises at least one temperature sensor and/or one humidity sensor integrated into the decoupling layer. The temperature sensors may for example comprise thermistors or microthermometers, that provide temperature signals used in the control of the seat heating or in the classification of the passenger so as to compensate for thermal effects. A humidity sensor will for example be used to turn on the seat heating when a certain degree of humidity is detected. It will be appreciated that due to the integration of the sensors into the decoupling layer, they are less exposed to mechanical stresses and consequently better protected against faults.

The person skilled in the art will readily understand that the flexible pressure sensor may be chosen from among several types. Thus, in a first variant, said pressure sensor comprises a first and a second flexible substrate, said first and second flexible substrates being arranged a certain distance one above the other with the aid of a spacer, two electrode structures disposed on said first substrate a certain distance from one another, and a layer of semiconducting material disposed on said second substrate opposite the two electrode structures.

In another variant, the pressure sensor comprises a first and a second flexible substrate, said first and second flexible substrates being arranged a certain distance one above the other with the aid of a spacer, a first and a second electrode structure, said first electrode structure being disposed on said first substrate and said second electrode structure being disposed on said second substrate opposite said first electrode structure, and a layer of semiconducting material disposed between said first electrode structure and said second electrode structure.

Alternatively, said pressure sensor can comprise a flexible support made of insulating material, at least two electrode structures disposed on said insulating substrate a certain distance from one another, and a layer of semiconducting material disposed in intimate contact on said electrode structures in an active zone of the detector, said layer of semiconducting material exhibiting an internal resistance varying with a deformation of said layer.

BRIEF DESCRIPTION OF THE DRAWINGS

Other features and characteristics of the invention will emerge from the detailed description of a few advantageous embodiments presented hereinbelow, by way of illustration, with reference to the appended drawings. The latter show.

DETAILED DESCRIPTION OF THE INVENTION

Figure 1:
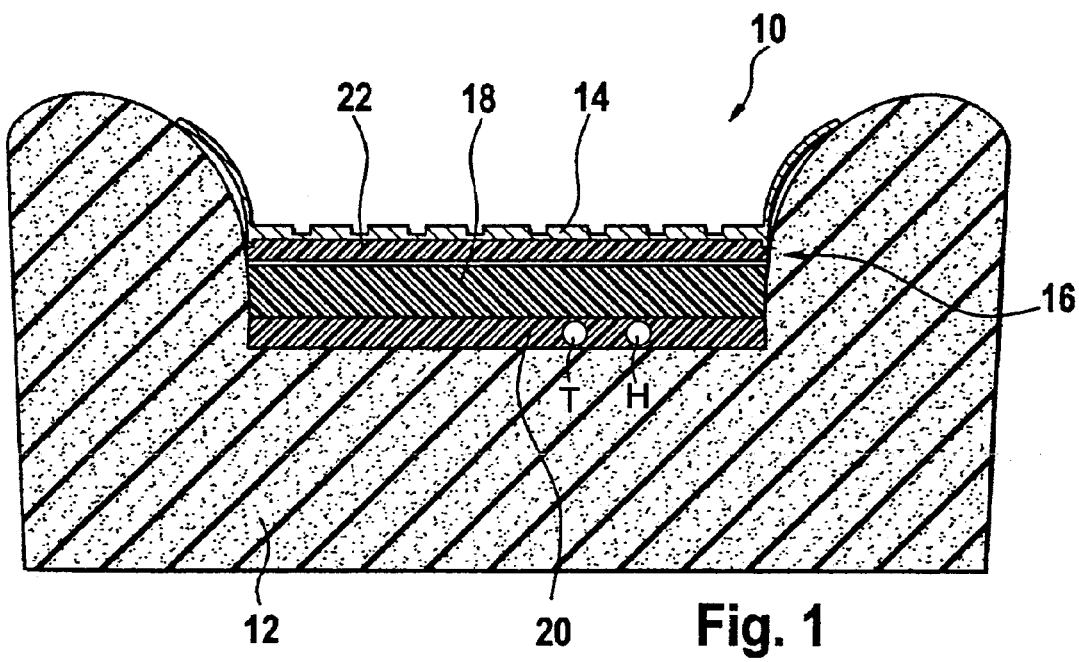
FIG. 1: a cross section through an automobile seat with a detection device.
Figure 2:
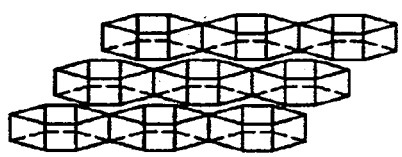
FIGS. 2 to 5: various possible executions of the decoupling layer.

FIG. 1 shows a transverse section through an execution of the detection device 10 according to the invention, the device being mounted on an automobile seat 12. The detection device 10 comprises a sandwich structure with a flexible pressure sensor 14 fixed to a decoupling layer 16.

The decoupling layer comprises a spacing structure 18 mounted on a nonwoven lower layer 20, which may comprise an integrated heating element. In a possible execution, the spacing structure can be sewn onto the nonwoven lower layer. An upper layer 22, e.g. a nonwoven layer, is fixed onto the spacing structure. This upper layer 22 exhibits an upper plane surface on which the sensor 14 is bonded.

As previously discussed, and in accordance with one embodiment of the present invention, a temperature sensor T and a humidity sensor H may be integrated within the lower nonwover layer 20.

It should be noted that the detection device 10 forms a prefabricatable module with a thickness of between 5 mm and 3 cm. Such a module is easily mounted on the seating surface of the seat 12 for example by bonding.

Figure 3:
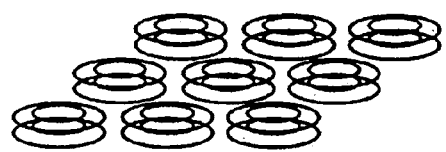
Figure 4:
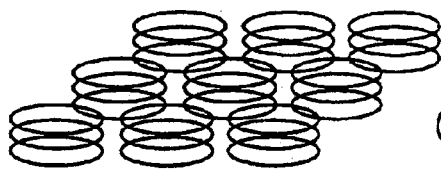
Figure 5:
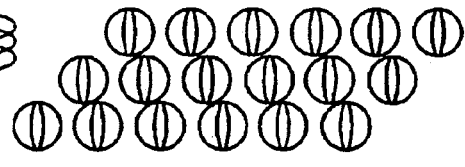

FIGS. 2 to 5 diagrammatically show various executions for the decoupling layer. An execution with a honeycomb spacing fabric is for example represented in FIG. 2. FIGS. 3 to 5 show executions in which the spacing structure of the decoupling layer comprises spacer elements such as rubber rings (FIG. 3), springs (FIG. 4) or gas pockets (FIG. 5). It is clear that any combination of these spacer elements is possible, as is a sandwich of several different decoupling layers.

Figure 6:
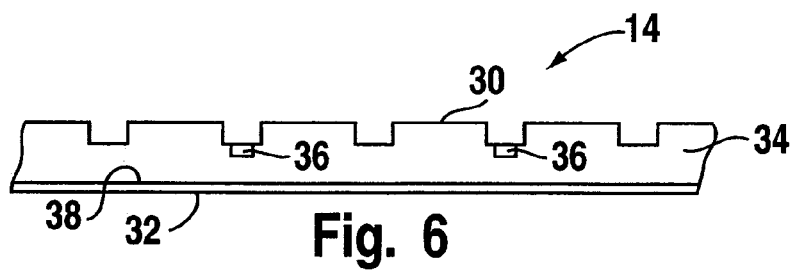
FIG. 6 illustrates the flexible pressure sensor of the detection device, in accordance with one embodiment of the present invention.

FIG. 6 illustrates the flexible pressure sensor 14 of FIG. 1, according to one embodiment of the present invention. As discussed previously, and as shown in FIG. 6, the flexible pressure sensor 14 comprises a first and second flexible substrate, 30 and 32 respectively. The first substrate 30 and the second substrate 32 being arranged a certain distance one above the other with the aid of a spacer 34. Two electrode structure 36 are disposed on the first substrate 30 a certain distance from one another, and a layer of semiconducting material 38 is disposed on the second substrate 32 opposite the two electrode structures 36.

What is claimed is:

1. A detection device for automobile seat, comprising a flexible pressure sensor, said pressure sensor comprising an upper face and a lower face, and a decoupling layer fixed on said lower face of the pressure sensor, said decoupling layer comprising a constant modulus of elasticity.

2. The detection device according to claim 1, wherein said decoupling layer comprises an open structure with a lower layer and a spacing structure disposed on said lower layer.

3. The detection device according to claim 2, wherein said spacing structure comprises flexible spacer elements distributed over a surface of the lower layer.

4. The detection device according to claim 3, wherein said spacer elements comprise neoprene blocks and/or rubber rings and/or metal springs and/or pockets filled with a gas.

5. The detection device according to claim 2, wherein said spacing structure comprises a spacing fabric.

6. The detection device according to claim 2, in which the decoupling layer comprises an upper layer of a nonwoven material.

7. The detection device according to claim 6, in which the pressure sensor is bonded onto the upper layer.

8. The detection device according to claim 6, in which the pressure sensor is assembled onto the upper layer by means of a self-fastening or magnetic system.

9. The detection device according to claim 2, in which the lower layer comprises a layer of nonwoven material.

10. The detection device according to claim 2, further comprising a heating element integrated into the decoupling layer.

11. The detection device according to claim 2, further comprising a temperature sensor and/or a humidity sensor integrated into the decoupling layer.

12. The detection device according to claim 2, wherein said pressure sensor comprises
 a first and a second flexible substrate, said first and second flexible substrates being arranged a certain distance one above the other by means of a spacer,
 two electrode structures disposed on said first substrate a certain distance from one another, and
 a layer of semiconducting material disposed on said second substrate opposite the two electrode structures.

13. The detection device according to claim 2, wherein said pressure sensor comprises
 a first and a second flexible substrate, said first and second flexible substrates being arranged a certain distance one above the other by means of a spacer,
 a first and a second electrode structure, said first electrode structure being disposed on said first substrate and said second electrode structure being disposed on said second substrate opposite said first electrode structure, and
 a layer of semiconducting material disposed between said first electrode structure and said second electrode structure.

14. The detection device according to claim 2, in which said pressure sensor comprises a flexible support made of insulating material, at least two electrode structures disposed on said insulating material a certain distance from one another, and a layer of semiconducting material disposed in intimate contact on said electrode structures in an active zone of the detection device, said layer of semiconducting material exhibiting an internal resistance varying with a deformation of said layer.

15. The detection device according to claim 1, further comprising a heating element integrated into the decoupling layer.

16. The detection device according to claim 1, further comprising a temperature sensor and/or a humidity sensor integrated into the decoupling layer.

17. The detection device according to claim 1, wherein said pressure sensor comprises
 a first and a second flexible substrate, said first and second flexible substrates being arranged a certain distance one above the other by means of a spacer,
 two electrode structures disposed on said first substrate a certain distance from one another, and
 a layer of semiconducting material disposed on said second substrate opposite the two electrode structures.

18. The detection device according to claim 1, wherein said pressure sensor comprises
 a first and a second flexible substrate, said first and second flexible substrates being arranged a certain distance one above the other by means of a spacer,
 a first and a second electrode structure, said first electrode structure being disposed on said first substrate and said second electrode structure being disposed on said second substrate opposite said first electrode structure, and
 a layer of semiconducting material disposed between said first electrode structure and said second electrode structure.

19. The detection device according to claim 1, in which said pressure sensor comprises a flexible support made of insulating material, at least two electrode structures disposed on said insulating material a certain distance from one another, and a layer of semiconducting material disposed in intimate contact on said electrode structures in an active zone of the detection device, said layer of semiconducting material exhibiting an internal resistance varying with a deformation of said layer.

* * * * *